(12) United States Patent
Suzuki et al.

(10) Patent No.: US 10,549,699 B2
(45) Date of Patent: Feb. 4, 2020

(54) CONTAINER

(71) Applicants: KOJIMA INDUSTRIES CORPORATION, Toyota-shi, Aichi-ken (JP); TOYOTA JIDOSHA KABUSHIKI KAISHA, Toyota-shi, Aichi-ken (JP)

(72) Inventors: Takahiro Suzuki, Toyota (JP); Kikuo Sugimura, Toyota (JP); Michio Nishiyama, Toyota (JP)

(73) Assignees: KOJIMA INDUSTRIES CORPORATION, Toyota-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 254 days.

(21) Appl. No.: 15/027,843

(22) PCT Filed: Oct. 7, 2014

(86) PCT No.: PCT/JP2014/076743
§ 371 (c)(1),
(2) Date: Apr. 7, 2016

(87) PCT Pub. No.: WO2015/053240
PCT Pub. Date: Apr. 16, 2015

(65) Prior Publication Data
US 2016/0250978 A1  Sep. 1, 2016

(30) Foreign Application Priority Data
Oct. 9, 2013  (JP) .................................. 2013-211737

(51) Int. Cl.
*B60R 7/04*  (2006.01)
(52) U.S. Cl.
CPC ..................................... *B60R 7/04* (2013.01)

(58) Field of Classification Search
CPC ....... B60R 7/04; B65D 11/18; B65D 11/1893; B65D 6/18
(Continued)

(56) References Cited

U.S. PATENT DOCUMENTS

| | | | | |
|---|---|---|---|---|
| 8,726,618 B1 * | 5/2014 | Laurita | .............. | B65D 11/1833 206/509 |
| 2004/0155037 A1 * | 8/2004 | Hoogland | .............. | B65D 1/225 220/6 |
| 2015/0028028 A1 * | 1/2015 | Matsuoka | .......... | B65D 11/1893 220/7 |

FOREIGN PATENT DOCUMENTS

| | | |
|---|---|---|
| JP | H08-91363 A | 4/1996 |
| JP | H09-131786 A | 5/1997 |
| JP | H10-218173 A | 8/1998 |

\* cited by examiner

*Primary Examiner* — Anthony D Stashick
*Assistant Examiner* — Kaushikkumar A Desai
(74) *Attorney, Agent, or Firm* — Hunton Andrews Kurth LLP (57) ABSTRACT

A container includes a bottom wall, an upper surface, and an outer end portion having an outwardly directed end surface. A side wall is provided that includes an inner surface and a lower end portion. An integral hinge is provided connecting a lower end portion of an inside wall integrally connected to an outer end portion of a bottom of the container and a lower end portion of the outside wall. The inner surface of the outside wall is offset from a downward extension of the side wall's inner surface. A lower surface of part the lower end portion of the side wall and lateral wall contacts the upper surface of the bottom wall in an up-down direction of the container. The inner surface of the outside wall contacts at least one of the outwardly directed end surfaces of the bottom wall and the outer surface of the inside wall.

3 Claims, 7 Drawing Sheets

(58) Field of Classification Search
USPC .............................. 220/4.28, 6, 7, 636, 638
See application file for complete search history.

CONTAINER

CROSS-REFERENCE TO RELATED APPLICATIONS

This is a national phase application based on the PCT International Patent Application No. PCT/JP2014/076743 filed Oct. 7, 2014, claiming priority to Japanese Patent Application No. 2013-211737 filed Oct. 9, 2013, the entire contents of both of which are incorporated herein by reference.

TECHNICAL FIELD

The present invention relates to a container used for, for example, a center-console box of a vehicle.

BACKGROUND

Figure 7:
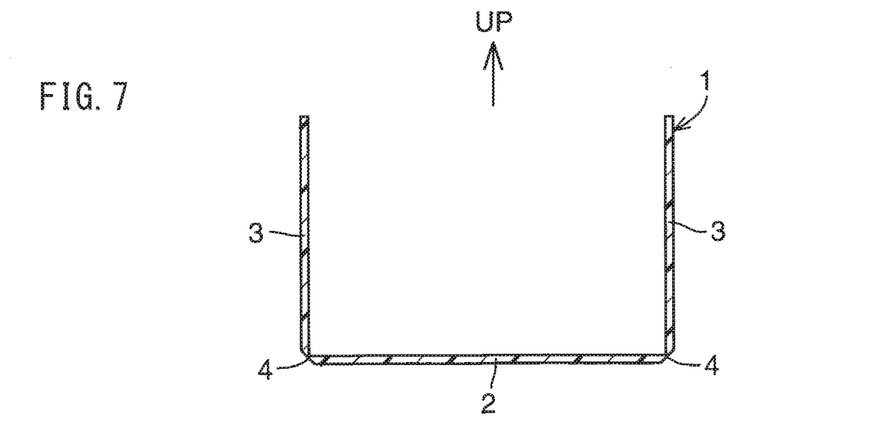
FIG. 7 is a cross-sectional view of a conventional container.

As illustrated in FIG. 7, Japanese Patent Publication HEI 9-131786 discloses a container 1 having a bottom wall 2, and a rising wall 3 rising from the bottom wall 2 via an integral hinge 4.

Figure 8:
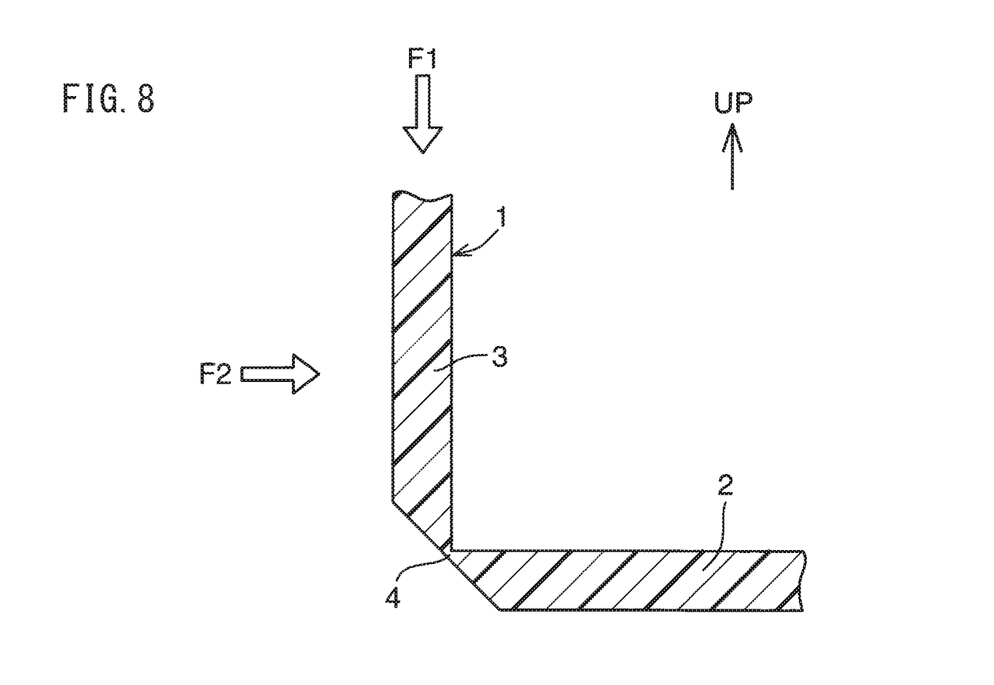
FIG. 8 is a partial enlarged view of an integral hinge of the container (and its vicinity) of FIG. 7.

However, there are the following problems with the conventional container 1:

As illustrated in FIG. 8, when a force F1 is loaded on the container 1 from an up direction of the container or when a force F2 is loaded on the container 1 from a lateral direction of the container, the container 1 may be damaged at the integral hinge 4.

PRIOR ART DOCUMENT

Patent Document

Patent Document 1: Japanese Patent Publication HEI 9-131786

BRIEF SUMMARY

Object of Embodiments of the Invention

An object of embodiments of the invention is to provide a container which is improved in a strength compared with that of the conventional container.

SUMMARY

Embodiments of the present invention for achieving the above object provides a container that includes a bottom wall directed in a lateral direction of the container perpendicular to an up-down direction of the container and including an upper surface and an outer end portion having an outwardly directed end surface;

a side wall separate from the bottom wall and extending upward relative to the bottom wall, the side wall including an inner surface and a lower end portion;

an inside wall integrally connected to the outer end portion of the bottom wall and extending downward from the outer end portion of the bottom wall, the inside wall having an outer surface;

a lateral wall integrally connected to the lower end portion of the side wall and extending outwardly from the lower end portion of the side wall in the lateral direction of the container;

an outside wall integrally connected to a first portion of a combination of the lower end portion of the side wall and the lateral wall and extending downward from the first portion of the combination of the lower end portion of the side wall and the lateral wall, the outside wall having an inner surface; and an integral hinge connecting a lower end portion of the inside wall and a lower end portion of the outside wall.

The inner surface of the outside wall is laterally and outwardly offset from a downward extension of the inner surface of the side wall.

A lower surface of a second, remaining portion of the combination of the lower end portion of the side wall and lateral wall excluding the first portion contacts the upper surface of the bottom wall in an up-down direction of the container.

The inner surface of the outside wall contacts at least one of the outwardly directed end surface of the bottom wall and the outer surface of the inside wall.

In another embodiment, a container is provided as described above wherein the side wall includes a pair of first side wall elements extending in a first direction and opposing each other in a second direction perpendicular to the first direction and a pair of second side wall elements extending in the second direction and opposing each other in the first direction.

Each pair of first side wall elements has opposite ends, at each of which a step defined by a surface extending in the second direction and facing in the first direction is formed.

Each of opposite ends of the pair of second side wall elements surface-contacts the surface of the step of each of the opposite ends of the first side wall elements in the first direction.

TECHNICAL ADVANTAGES

According to the container described above, the synthetic plane 80 (see, e.g., FIG. 6) of the lower end portion of the side wall and the lateral wall contacts the upper surface of the bottom wall in the up-down direction of the container. Therefore, when a force F1 is loaded on the container from the up direction of the container, the force F1 can be received by the bottom wall. Therefore, the force F1 can be suppressed from being loaded on the integral hinge. As a result, a strength of the container can be improved.

Further, the inner surface of the outside wall contacts at least one of the outwardly directed end surface of the bottom wall and the outer surface of the inside wall. Therefore, when a force F2 is loaded on the container from a lateral direction, the force F2 can be received by at least one of the bottom wall and the inside wall. Therefore, the force F2 can be suppressed from being loaded on the integral hinge. As a result, a strength of the container can be improved.

DETAILED DESCRIPTION

A container according to embodiments of the present invention will be explained with reference to the drawings. In the drawings, "UP" shows an upper direction.

A container 10 according to embodiments of the present invention opens toward an up-direction. The container 10 is made from resin. The container 10 is constructed to a container configuration shown in FIG. 1 after molding to a development configuration shown in FIG. 2. The container 10 is used for, for example, a center-console box disposed between a front driver seat and a front passenger seat of a vehicle. In a case where the container 10 is used for the center-console box, (i) the container 10 is fixed to a floor panel (not shown) of a vehicle at a fixing portion 11 of the container by using bolts (not shown). (ii) The container 10 is fixed to console side-panels (not shown) provided outside of the container 10 in the right-left direction of the vehicle at coupling portions 12 of the container. (iii) A penetration hole 13 through which a wire harness (not shown) is passed may be formed at the container 10. And (iv) a console lid (not shown) for opening and closing an opening of a housing space S of the container 10 is provided above the container 10.

Figure 3:
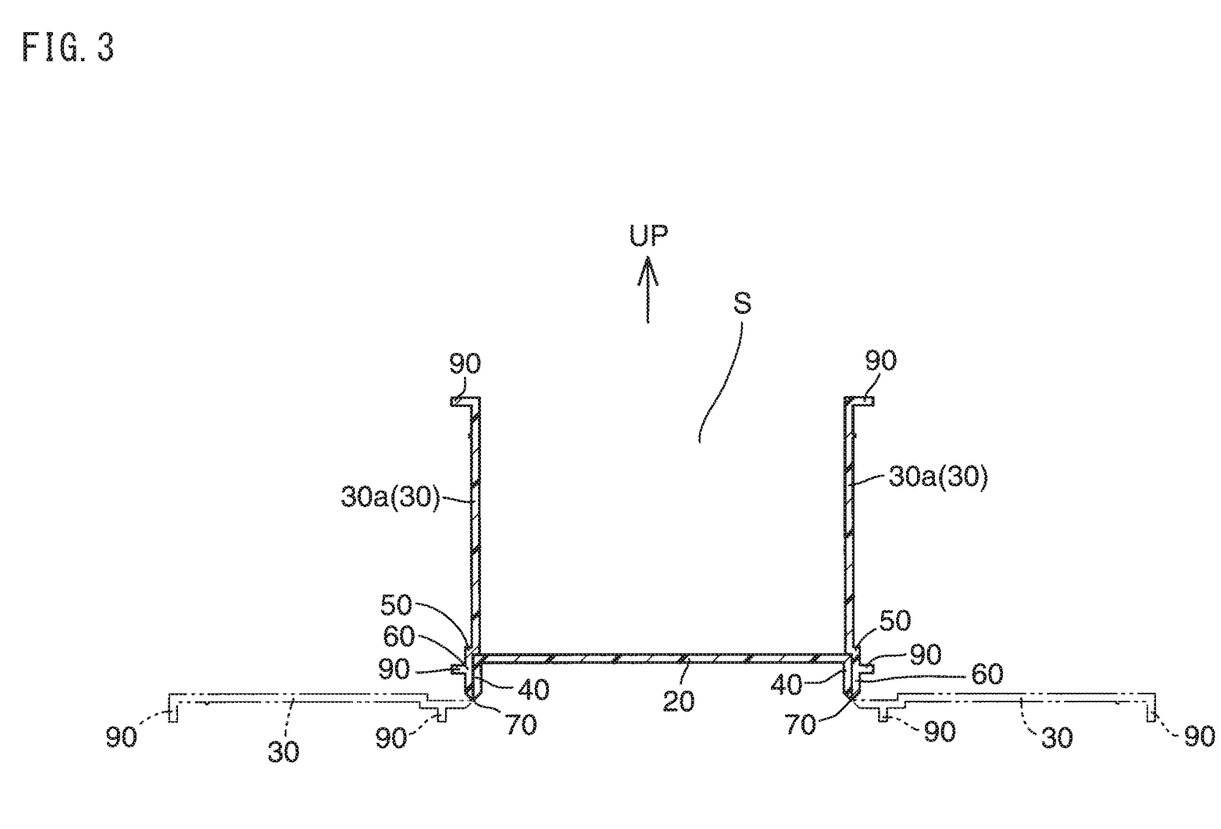
FIG. 3 is a cross-sectional view of the container of FIG. 1 taken along line A-A in FIG. 1.

As illustrated in FIG. 3, the container 10 includes a bottom wall 20, a side wall 30, an inside wall 40, a lateral wall 50, an outside wall 60 and an integral hinge 70. The bottom wall 20, the side wall 30, the inside wall 40, the lateral wall 50, the outside wall 60 and the integral hinge 70 are formed as a single part member and are formed integrally.

Figure 2:
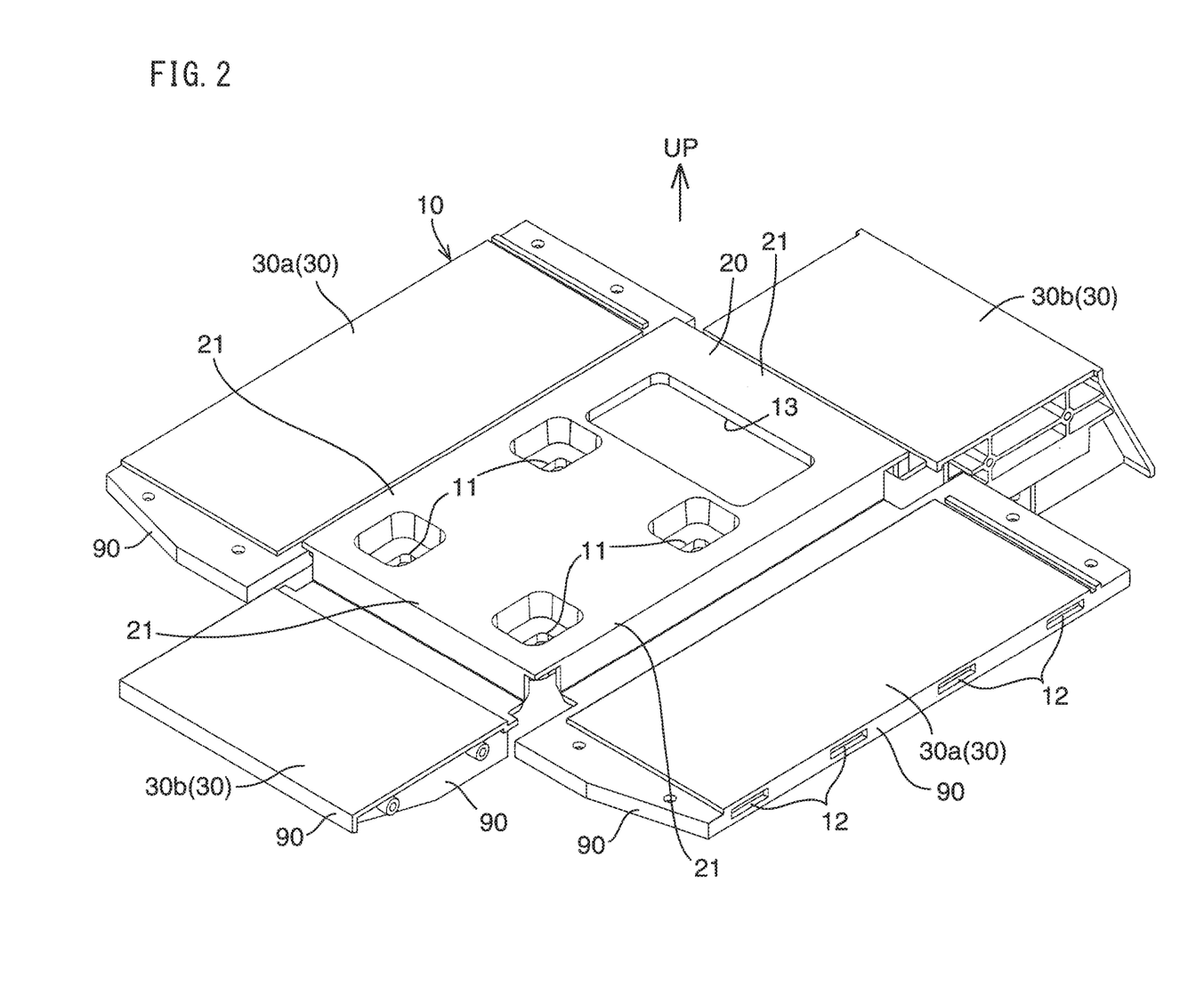
FIG. 2 is a development perspective view of the container according to an embodiment of the present invention.

As illustrated in FIG. 2, in a plan view, the bottom wall 20 is rectangular. The fixing portion 11 and the penetration hole 13 are provided at the bottom wall 20 except for an outer end portion 21 of the bottom wall 20. A single fixing portion 11 may be provided, or a plurality of fixing portions 11 may be provided. In the drawings, four fixing portions 11 are provided. A single penetration hole 13 may be provided, or a plurality of penetration holes 13 may be provided. In the drawings, a single penetration hole 13 is provided.

Figure 1:
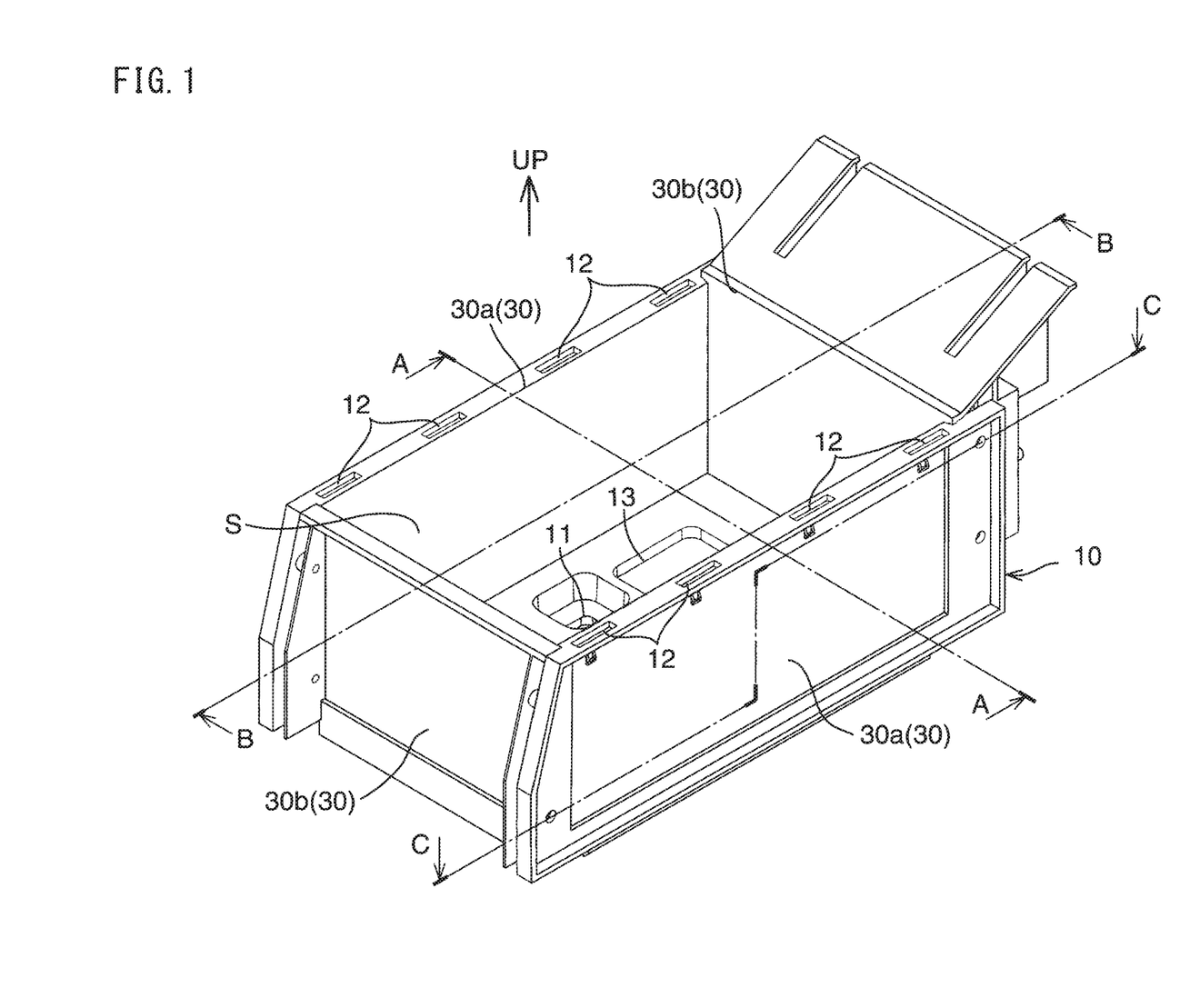
FIG. 1 is a perspective view of a container according to an embodiment of the present invention.
Figure 6:
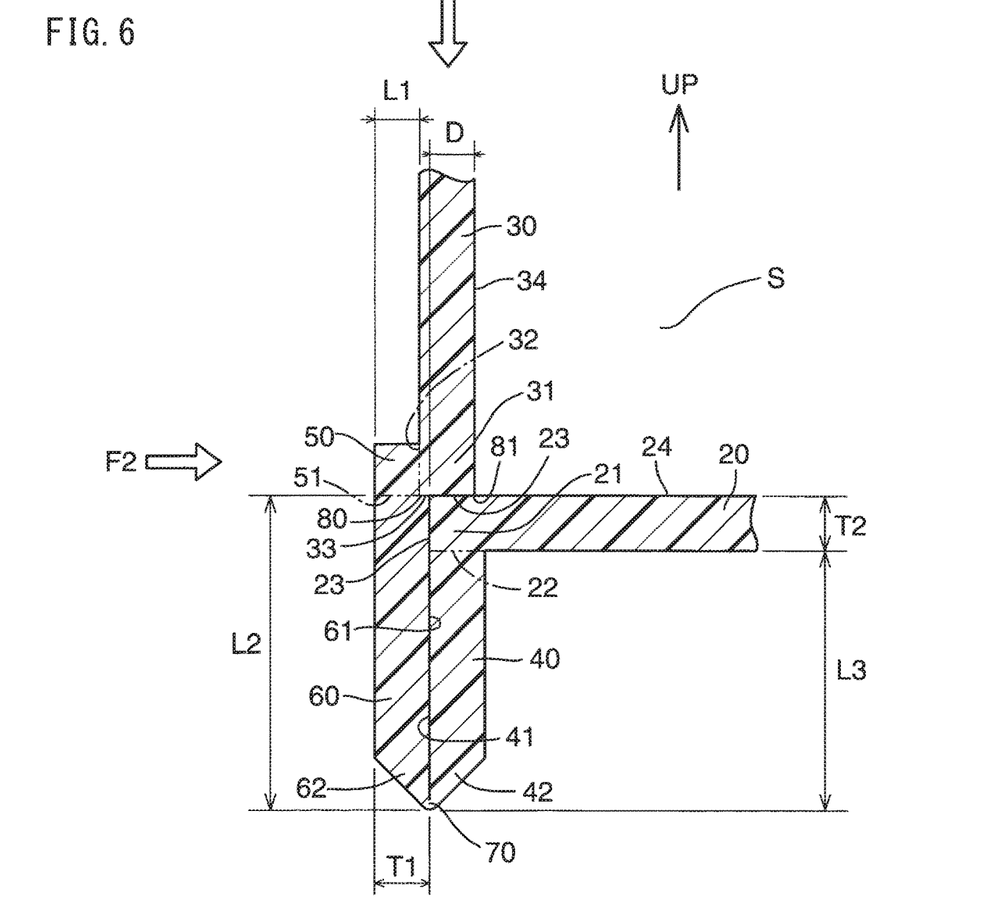
FIG. 6 is a partial enlarged view of an integral hinge of the container (and its vicinity) of FIG. 4, where each of chain double-dashed lines shows dividing lines between components of the container.

As illustrated in FIG. 1, the side wall 30 extends upwardly relative to the bottom wall 20. The coupling portions 12 are provided at an upper end of the side wall 30. As illustrated in FIG. 6, the side wall 30 is connected to the bottom wall 20 via the inside wall 40, the lateral wall 50, the outside wall 60 and the integral hinge 70.

Figure 5:
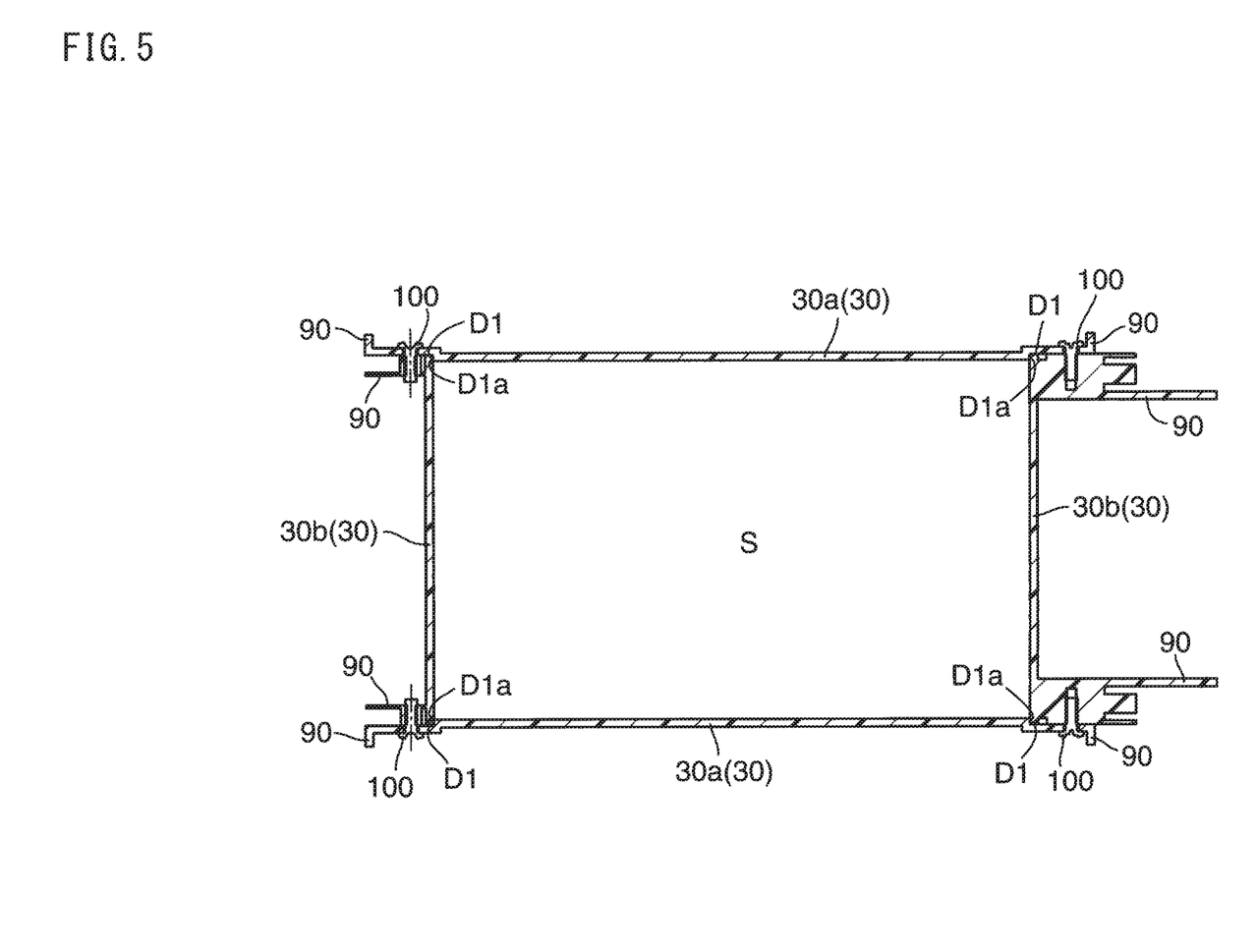
FIG. 5 is a cross-sectional view of the container of FIG. 1 taken along line C-C in FIG. 1.

As illustrated in FIG. 5, the side wall 30 includes a pair of first side wall elements 30a, 30a opposing each other and a pair of second side wall elements 30b, 30b opposing each other. A direction in which the pair of first side wall elements 30a, 30a oppose each other and a direction in which the pair of second side wall elements 30b, 30b oppose each other are perpendicular to each other. Each of the first side wall elements 30a, 30a and each of the second side wall elements 30b, 30b are fixed to each other by using a screw 100 etc. outside the housing space S.

As illustrated in FIG. 6, the inside wall 40 is integrally connected to a lower plane 22 of the outer end portion 21 of the bottom wall 20 and extends downward from the lower plane 22. The inside wall 40 extends downward and straight from the lower plane 22. An outer surface 41 of the inside wall 40 and an outwardly directed end surface 23 of the bottom wall 20 are connected to each other and are in a single plane.

The lateral wall 50 is integrally connected to an outer surface 32 of a lower end portion 31 of the side wall 30 and extends outwardly from the outside surface 32 in a lateral direction of the container 10. A length L1 of the lateral wall 50 from the outer surface 32 in the lateral direction may be smaller than a thickness T1 of the outside wall 60, may be equal to the thickness T1 of the outside wall 60, or may be larger than the thickness T1 of the outside wall 60. A lower plane 51 of the lateral wall 50 and a lower end plane 33 of the side wall 30 are connected to each other and are in a single plane. A synthetic plane 80 of the lower plane 51 of the lateral wall 50 and the lower end plane 33 of the side wall 30 (i.e., a combination of the lower plane 51 of the lateral wall 50 and the lower end plane 33 of the side wall 30) contacts an upper surface 24 of the bottom wall 20 in an up-down direction of the container. The synthetic plane 80 surface-contacts the upper surface 24 of the bottom wall 20.

The outside wall 60 is integrally connected to the synthetic plane 80 and extends downward from a portion of the synthetic plane 80. The outside wall 60 extends downward from a portion of the synthetic plane 80 except for an inner end 81 of the synthetic plane 80 (an inner end of the lower end surface 33 of the side wall 30). Therefore, an inner surface 61 of the outside wall 60 is laterally and outwardly offset from a downward extension of an inner surface 34 of the side wall 30. The inner surface 61 of the outside wall 60 is disposed more outward than the inner surface 34 of the side wall 30. As a result, a step D is formed between the inner surface 61 of the outside wall 60 and the inner surface 34 of the side wall 30.

As illustrated in FIG. 5, a step D1 being the same as the step D is formed at each of opposite ends of each pair of first side wall elements 30a, 30a. Each of opposite ends of the pair of second side wall elements 30b, 30b is engaged with (surface-contacts) a step D1-defining surface D1a.

As illustrated in FIG. 6, a length L2 of the outside wall 60 from the synthetic plane 80 in the up-down direction of the container is equal to (or substantially equal to) a sum of a thickness T2 of the bottom wall 30 and a length L3 of the inside wall 40 in the up-down direction of the container. The inner surface 61 of the outside wall 60 contacts at least one of the outwardly directed end surface 23 of the bottom wall 20 and the outer surface 41 of the inside wall 40 in the lateral direction of the container. The inner surface 61 of the outside wall 60 surface-contacts at least one of the outwardly directed end surface 23 of the bottom wall 20 and the outer surface 41 of the inside wall 40 in the lateral direction of the container.

Figure 4:
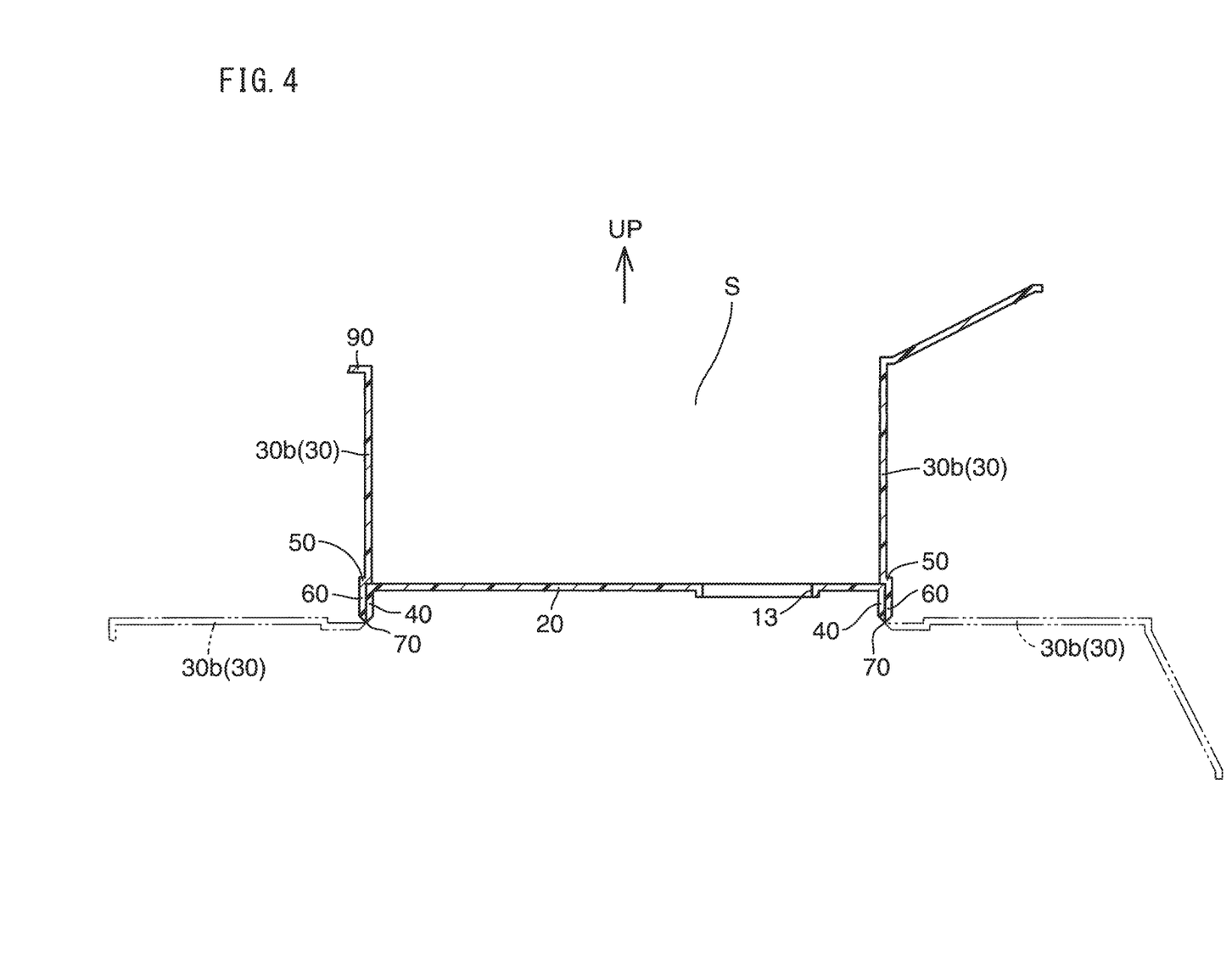
FIG. 4 is a cross-sectional view of the container of FIG. 1 taken along line B-B in FIG. 1.

As illustrated in FIGS. 3-5, a rib 90 may be integrally provided in at least one of the bottom wall 20, the side wall 30, the inside wall 40, the lateral wall 50 and the outside wall 60 in order to improve rigidity of the container 10. The rib 90 is provided outside the housing space S of the container 10 in order to maintain a large volume for the housing space S.

As illustrated in FIG. 6, the integral hinge 70 connects a lower end portion 42 of the inside wall 40 and a lower end portion 62 of the outside wall 60. The integral hinge 70 is disposed downward apart from the upper surface 24 of the bottom wall 20. The integral hinge 70, the inside wall 40 and the outside wall 60 are formed integrally. A thickness of the container 10 at the integral hinge 70 is extremely smaller than (i) a thickness of the inside wall 40 except for the lower end portion 42 of the inside wall 40 and (ii) a thickness of the outside wall 60 except for the lower end portion 62 of the outside wall 60.

Next, operation and technical advantages of embodiments of the present invention will be explained.

(A) Since the synthetic plane 80 of the lower end plane 33 of the side wall 30 and the lower plane 51 of the lateral wall 50 contacts the upper surface 24 of the bottom wall 20 in the up-down direction of the container, when a force F1 is loaded on the container 10 (the side wall 30) from the up direction of the container, the force F1 can be received by the bottom wall 20. Therefore, the force F1 can be suppressed from being loaded on the integral hinge 70. As a result, a strength of the container can be improved.

Further, since the inner surface 61 of the outside wall 60 contacts at least one of the outwardly directed end surface 23 of the bottom wall 20 and the outer surface 41 of the inside wall 40 in the lateral direction of the container, when a force F2 is loaded on the container 10 from the lateral direction of the container, the force F2 can be received by at least one of the bottom wall 20 and the inside wall 40. Therefore, the force F2 can be suppressed from being loaded on the integral hinge 70. As a result, a strength of the container can be improved.

(B) (i) The synthetic plane 80 of the lower end plane 33 of the side wall 30 and the lower plane 51 of the lateral wall 50 contact the upper surface 24 of the bottom wall 20. (ii) The inner surface 61 of the outside wall 60 surface-contacts at least one of the outwardly directed end surface 23 of the bottom wall 20 and the outer surface 41 of the inside wall 40. And (iii) each of opposite ends of the pair of second side wall elements 30b, 30b is engaged with (surface-contacts) the step D1-defining surface D1a. Therefore, a gap can be suppressed from occurring at a corner C1 formed by the bottom wall 20, the first side wall element 30a and the second side wall element 30b.

EXPLANATION OF REFERENCE NUMERALS 10 container
11 fixing portion
12 coupling portion
13 penetration hole
20 bottom wall
21 outer end portion of the bottom wall
22 lower plane of the outer end portion of the bottom wall
23 outwardly directed end surface of the bottom wall
24 upper surface of the bottom wall
30 side wall
30a first side wall element
30b second side wall element
31 lower end portion of the side wall
32 outer plane of the lower end portion of the side wall
33 lower end plane of the side wall
34 inner surface of the side wall
40 inside wall
41 outer surface of the inside wall
42 lower end portion of the inside wall
50 lateral wall
51 lower plane of the lateral wall
60 outside wall
61 inner surface of the outside wall
62 lower end portion of the outside wall
70 integral hinge
80 synthetic plane
81 inner end of the synthetic plane
90 rib
C1 corner
D step
D1 step
D1a surface of the step
S housing space
L1 length of the lateral wall in a lateral direction
L2 length of the outside wall in an up-down direction
L3 length of the inside wall in the up-down direction
T1 thickness of the outside wall
T2 thickness of the bottom wall

What is claimed is:

1. A container comprising:
a bottom wall directed in a lateral direction of the container perpendicular to an up-down direction of the container and including an upper surface and an outer end portion having an outwardly directed end surface;
a side wall separate from the bottom wall and extending upward relative to the bottom wall, the side wall including an inner surface, a lower end portion and a rib;
an inside wall integrally connected to the outer end portion of the bottom wall and extending downward from the outer end portion of the bottom wall, the inside wall having an outer surface;
a lateral wall integrally connected to an outer surface of the lower end portion of the side wall and extending outwardly from the lower end portion of the side wall in the lateral direction of the container;
an outside wall integrally connected to a first, one portion of a combination of the lower end portion of the side wall and the lateral wall and extending downward from the first portion of the combination of the lower end portion of the side wall and the lateral wall, the outside wall having an inner surface;
a rib integrally provided in at least one of the bottom wall, the side wall, the inside wall, the lateral wall, and the outside wall, and
an integral hinge connecting a lower end portion of the inside wall and a lower end portion of the outside wall, wherein
the inner surface of the outside wall is laterally and outwardly offset from a downward extension of the inner surface of the side wall,
a lower surface of a second, remaining portion of the combination of the lower end portion of the side wall and lateral wall excluding the first portion contacts the upper surface of the bottom wall in an up-down direction of the container,
the inner surface of the outside wall contacts at least one of the outwardly directed end surface of the bottom wall and the outer surface of the inside wall,
a step is formed between the inner surface of the outside wall and the inner surface of the side wall, and
the step is smaller in magnitude than a thickness of the side wall except the rib of the side wall.

2. The container according to claim 1, wherein
the side wall includes a pair of first side wall elements extending in a first direction and opposing each other in a second direction perpendicular to the first direction and a pair of second side wall elements extending in the second direction and opposing each other in the first direction,
each of the pair of first side wall elements has opposite ends, at each of which another step defined by a surface extending in the second direction and facing in the first direction is formed, and each of opposite ends of the pair of second side wall elements surface-contacts the surface of the another step of each of the opposite ends of the first side wall elements in the first direction.

3. The container according to claim 1, wherein the lateral wall has a thickness.

* * * * *